Oct. 15, 1940.  C. H. C. FLOWER  2,218,086
INSTRUMENT FOR USE IN THE PRACTICE OF IRIDIAGNOSCOPY
Filed March 19, 1938  2 Sheets-Sheet 1

CYRIL HORACE CRICKMORE FLOWER
INVENTOR
By Otto Munk
HIS ATT'Y.

Oct. 15, 1940.　　C. H. C. FLOWER　　2,218,086
INSTRUMENT FOR USE IN THE PRACTICE OF IRIDIAGNOSCOPY
Filed March 19, 1938　　2 Sheets-Sheet 2
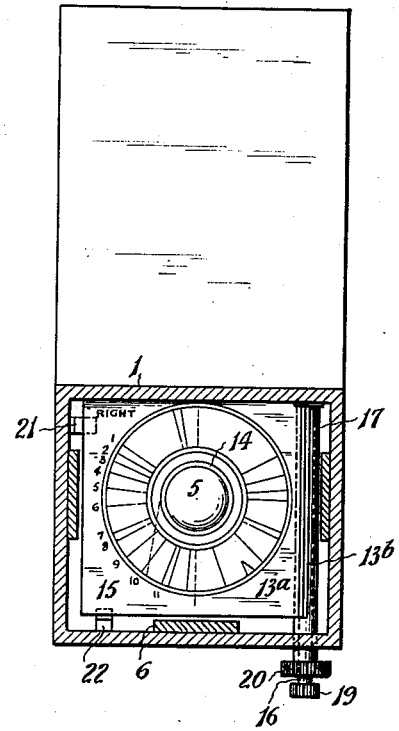
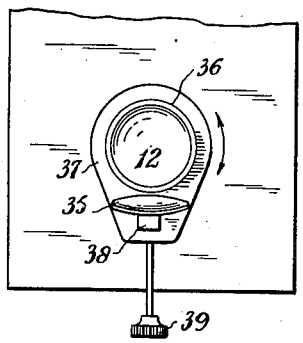
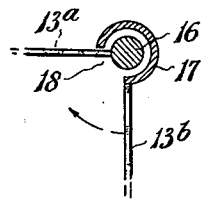
CYRIL HORACE CRICKMORE FLOWER
INVENTOR
By Otto Munk
HIS ATT'Y.

Patented Oct. 15, 1940

2,218,086

UNITED STATES PATENT OFFICE 2,218,086

INSTRUMENT FOR USE IN THE PRACTICE OF IRIDIAGNOSCOPY

Cyril Horace Crickmore Flower, Melbourne, Victoria, Australia

Application March 19, 1938, Serial No. 196,833
In Australia August 17, 1937

3 Claims. (Cl. 88—20)

This invention relates to an improved optical instrument for use in the practice of iridiagnoscopy, that is the science of determining the condition of the physical body and its organs and parts by an examination of the irises of the eyes.

The invention has been devised to provide a complete self-contained instrument by which the iris can be illuminated and magnified and examined with reference to an iridiagnostic chart or charts contained within the instrument so as to lie within the observer's line of vision and encircle the magnified image of the iris.

The improved instrument enables the observer to more conveniently and clearly examine the iris of the eye, and also allows him to refer to the iridiagnostic chart simultaneously with the examination of the iris. There is thus no need for the observer to remove his eye from the instrument during the course of the examination for the purpose of referring to the chart, or to insert or remove charts from the instrument.

The instrument embodies means for magnifying the iris of the eye, means for focussing the magnifying lenses as required, means for directing a beam of light onto the iris of the eye to illuminate the latter, means for mounting the iridiagnostic chart or charts in the line of vision so as to be clearly visible to the observer while examining the iris, means for moving various charts into view as required, and means for illuminating the chart in use.

The instrument also includes the feature of using a beam of converging rays of light for the illumination of the iris to so avoid inconvenient reflections of the light source on the iris of the eye, and the provision of means for adjusting the direction and intensity of the illumination as found desirable in different circumstances.

In the accompanying drawings to which reference is made:

Fig. 3 is a vertical section on the line 3—3 of Fig. 1.

Fig. 4 is a detail view of means for adjusting the direction of the iris illuminating means.

Figs. 5 and 6 are sectional detail views of the means for mounting the charts within the instrument.

Figure 1:
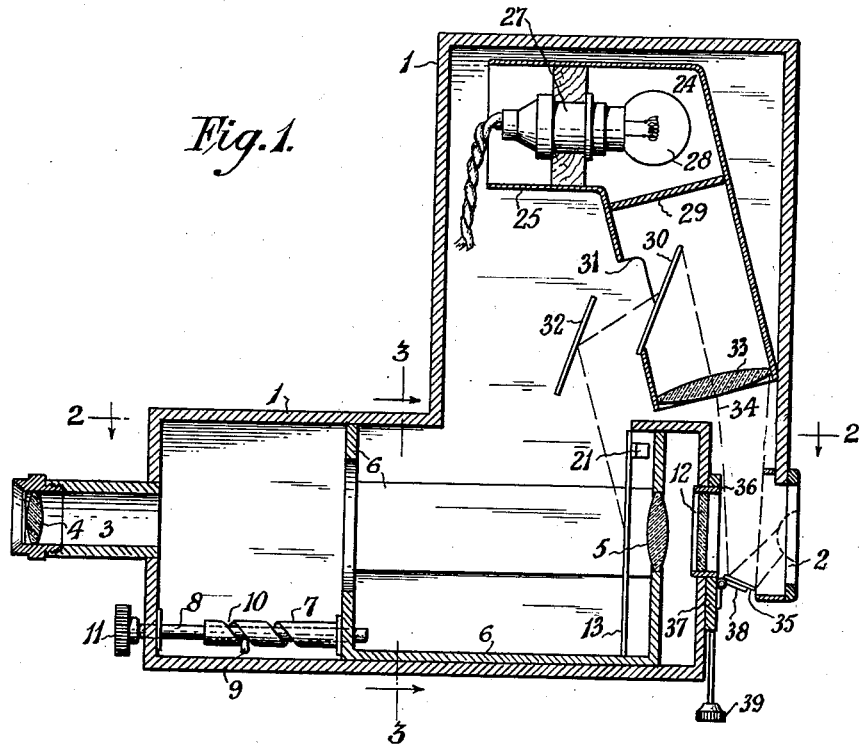
Fig. 1 is a vertical sectional view of the instrument according to one representative construction.

In the embodiment as illustrated in these views, the instrument comprises a casing 1 having a circular or other appropriately shaped frame 2 at one end within which the patient places the eye to be examined. At the other end of the casing is an eye piece 3 through which the observer looks.

The iris of the eye under examination is magnified by means of two lenses 4 and 5. The lens 4 is mounted in the eye piece 3 and is stationary. The other lens 5 is supported by a frame 6 which is slidably adjustable within the casing for focussing purposes.

The frame 6 can be adjusted by any convenient means. In the construction shown, a sleeve 7 is secured to the forward end of the frame and receives the end of a shaft 8 rotatably mounted in the end of the casing 1. The shaft 8 has a pin 9 engaging a helical slot 10 in the sleeve.

By means of a suitable knob 11, the shaft 8 can be rotated and, through the pin 9 and slot 10, the frame 6 carrying the lens 5 is moved forwardly or rearwardly as desired to obtain correct focussing.

Mounted in advance of the adjustable lens 5 is a glass 12 which acts to prevent ingress of dust or other foreign material to the instrument.

The charts 13 used with the instrument are preferably arranged in front of the adjustable lens 5 and are so mounted as to be pivotally swung into the line of vision. The charts when in visible position surround the magnified image of the iris and for this purpose each chart has a central hole 14 through which the image of the iris is viewed and a surrounding iridiagnostic diagram 15 preferably having numbered sections for reference.

In the drawings, two charts are shown, one being intended for use when the right eye is being examined and the other when the left eye is being examined. One chart 13a is mounted on a vertical shaft 16 while the other chart 13b is secured to a sleeve 17 surrounding the said shaft. The sleeve has an arcuate opening 18 through which the chart 13a extends, see Figs. 5 and 6.

Figure 2:
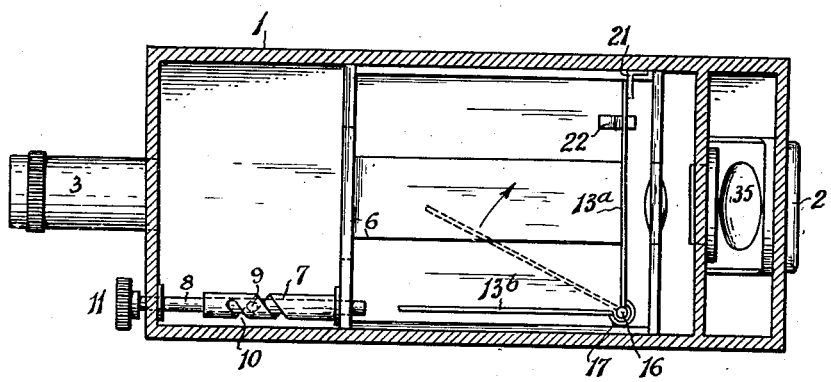
Fig. 2 is a horizontal section on the line 2—2 of Fig. 1.

The shaft 16 and sleeve 17 project from the underside of the casing 1 and are fitted with knobs 19 and 20 respectively by which they can be rotated to move the charts into view. Fig. 5 shows the chart 13a in position for viewing and the other chart 13b closed against the side of casing out of use. The chart 13b is brought into view when required by swinging it across the other chart so that it lies against the latter, see Fig. 6 and the dotted lines in Fig. 2.

More than two charts can of course be mounted together to be swung into position as described, and if desired, a second group of charts can be similarly mounted on the opposite side of the casing 1. In such arrangement one group may consist of charts of diagrammatic nature while the other group consists of pictorial charts.

The actual means employed for moving the charts can of course be varied as desired. For instance, instead of the knobs 19 and 20 on the underside of the casing, an extended form of operating gear may be used whereby the charts can be swung into position as desired by means of suitable controls on the front of the casing adjacent to the focussing knob 11.

A suitable stop member as 21 is preferably provided to form the correct stopping point for the charts, and a spring finger 22 or the like may be provided to hold the chart or charts in the viewing position.

Provided on the upper portion of the casing 1 is an extension or housing 23 which accommodates a light tube 24 of angular shape having a horizontal portion 25 and a downwardly inclined portion 26. The horizontal portion of the tube supports a lamp holder 27 fitted with a lamp 28 which is arranged substantially in line with the axis of the downwardly inclined portion 26 of the tube.

Fitted beneath the lamp is a screen 29 of frosted glass or the like to prevent any objectionable reflection of the filament of the lamp.

Mounted in the portion 26 of the light tube is an inclined mirror 30 arranged to extend approximately midway across the tube to intercept approximately half of the light rays. The mirror reflects the rays through an opening 31 in the tube onto a second inclined mirror 32 which, in turn, reflects them downwardly onto the chart in use.

By the means described the face of the chart is effectively illuminated by light projected onto it at such an angle that it does not interfere with the examination of the iris.

The remaining rays of light which continue through the tube past the mirror 30 strike a lens 33 which is designed to produce a beam 34 of converging light rays. The beam strikes a mirror 35 mounted beneath the lens 12 and is thereby reflected onto the iris of the eye undergoing examination as shown in Fig. 1.

Preferably the screen 29 or the mirror 35 is made from glare filter glass to reduce glare and discomfort to the patient.

The mirror 35 is so mounted that its position can be conveniently adjusted to vary, as desired, the direction of the reflected beam of light illuminating the iris. In the construction shown in the drawings, a tube 36 extends outwardly from the front of the casing 1 and has a collar member 37 swivelly mounted thereon. The lower end of said member has a suitable hinged bracket as 38 to support the mirror 35 and is provided with an extended knob 39 by which said collar member can be swivelly rotated on the tube 36, as indicated by the arrows in Fig. 4, to move the mirror to the left or right as may be desired to illuminate any particular side or section of the iris. The hinged bracket 38 also enables the mirror 35 to be angularly adjusted as desired to control the direction of the reflected beam.

The swivel adjustment of the mirror 35 also varies the intensity of the illumination as the mirror is caused to be moved partly out of the beam of light and, by this means, the degree of illumination can be controlled as may be found desirable to suit the patient or other conditions.

The instrument will be found to be very efficient in use and will enable the science of iridiagnoscopy to be practised more conveniently and with greater accuracy than hitherto. The instrument also has the advantage that the observer can complete the examination of the iris without removing the eye from the instrument or inserting or removing charts. The illumination of the iris is also an important advantage as it enables different variations and shades in the sections of the iris to be more closely and clearly examined.

It will of course be understood that various modifications in constructional features and details can be made in the apparatus within the ambit and principles of the invention.

What I claim is:

1. An instrument for use in the practice of iridiagnoscopy comprising a casing having an aperture at one end adapted to be directed towards the patient's eye, an eye piece at the other end of the casing for the observer's eye, means for illuminating the iris of the patient's eye, a lens system producing a magnified image of the illuminated iris, a plurality of iridiagnostic charts pivotally mounted within the casing, means for swinging the charts individually into position at right-angles to the axis of the lens system for direct observation in conjunction with the examination of the iris, and means for illuminating the chart in position for observation.

2. An instrument for use in the practice of iridiagnoscopy comprising a casing having an aperture at one end adapted to be directed towards the patient's eye, an eye piece at the other end of the casing for the observer's eye, a lens system producing a magnified image of the illuminated iris, a plurality of iridiagnostic charts pivotally mounted within the casing, means for swinging the charts individually into position at right-angles to the axis of the lens system for direct observation in conjunction with the examination of the iris, a lamp mounted within the casing, means for directing a portion of the light from said lamp onto the chart swung into position for observation, and means for also directing a portion of the light from the same lamp onto the iris to illuminate the latter.

3. An instrument for use in the practice of iridiagnoscopy comprising a casing having an aperture at one end adapted to be directed towards the patient's eye, an eye piece at the other end of the casing for the observer's eye, a lens system producing a magnified image of the illuminated iris, a plurality of iridiagnostic charts pivotally mounted within the casing, means for swinging the charts individually into position at right-angles to the axis of the lens system for direct observation in conjunction with the examination of the iris, a lamp mounted within the casing, means for directing a portion of the light from said lamp onto the chart swung into position for observation, a lens through which a portion of the light from the same lamp passes to produce a controlled beam of light rays, a mirror for directing said beam of light rays onto the iris, and means for angularly moving said mirror to adjust the direction of the beam.

CYRIL HORACE CRICKMORE FLOWER.